United States Patent
Del Favero, Jr. et al.

(10) Patent No.: US 7,548,899 B1
(45) Date of Patent: Jun. 16, 2009

(54) METHOD AND SYSTEM FOR INFORMATION RETRIEVAL BASED ON MENU SELECTIONS

(76) Inventors: John P. Del Favero, Jr., 3725 Laurel Way, Redwood City, CA (US) 94062; Wayne Chan, 19300 Skyline Blvd., Los Gatos, CA (US) 95033

( * ) Notice: Subject to any disclaimer, the term of this patent is extended or adjusted under 35 U.S.C. 154(b) by 227 days.

(21) Appl. No.: 10/006,930

(22) Filed: Dec. 6, 2001

Related U.S. Application Data

(60) Provisional application No. 60/286,259, filed on Apr. 24, 2001, provisional application No. 60/254,298, filed on Dec. 8, 2000.

(51) Int. Cl.
 *G06F 7/00* (2006.01)
 *G06F 17/30* (2006.01)
(52) U.S. Cl. .................. 707/1; 707/4; 707/10
(58) Field of Classification Search .............. 707/1–6, 707/10, 100, 103 R, 103 X, 104.1; 345/810, 345/864, 863, 853; 706/15, 11; 725/23; 715/854; 455/566; 370/351
See application file for complete search history.

(56) References Cited

U.S. PATENT DOCUMENTS

| | | | | | |
|---|---|---|---|---|---|
| 4,688,195 | A | * | 8/1987 | Thompson et al. ............. | 706/11 |
| 4,829,423 | A | * | 5/1989 | Tennant et al. ................. | 704/8 |
| 5,297,253 | A | * | 3/1994 | Meisel ........................ | 715/854 |
| 5,787,417 | A | | 7/1998 | Hargrove ....................... | 707/4 |
| 5,940,821 | A | | 8/1999 | Wical ............................ | 707/3 |
| 5,948,040 | A | * | 9/1999 | DeLorme et al. ............. | 701/201 |
| 5,977,948 | A | * | 11/1999 | Nishibori ..................... | 345/841 |
| 6,078,326 | A | | 6/2000 | Kilmer et al. ................ | 715/834 |
| 6,237,145 | B1 | * | 5/2001 | Narasimhan et al. .......... | 725/23 |
| 6,292,796 | B1 | * | 9/2001 | Drucker et al. ................. | 707/5 |
| 6,460,031 | B1 | * | 10/2002 | Wilson et al. ................. | 707/3 |
| 6,460,034 | B1 | | 10/2002 | Wical ............................ | 707/5 |
| 6,546,002 | B1 | * | 4/2003 | Kim ........................... | 370/351 |
| 6,564,210 | B1 | * | 5/2003 | Korda et al. ................... | 707/3 |
| 6,736,322 | B2 | * | 5/2004 | Gobburu et al. ........ | 235/462.46 |
| 7,027,975 | B1 | * | 4/2006 | Pazandak et al. .............. | 704/9 |
| 7,089,236 | B1 | * | 8/2006 | Stibel ............................ | 707/5 |
| 2002/0054148 | A1 | * | 5/2002 | Okada ........................ | 345/810 |

FOREIGN PATENT DOCUMENTS

| | | |
|---|---|---|
| WO | WO 00/36529 | 6/2000 |
| WO | WO 00/57257 | 9/2000 |

OTHER PUBLICATIONS

Harry Tennant, Kenneth Ross, Richard Saeanz, Graig Thompson, and James R. Miller (1983), Menu-based natural language understanding, pp. 151-158.*
E. M. Muechkstein (1985), Controlled Natural language interfaces: The Best of Three Worlds, pp. 176-178.*

* cited by examiner

*Primary Examiner*—Don Wong
*Assistant Examiner*—Merilyn P Nguyen

(57) ABSTRACT

Improved approaches to accessing information are disclosed. The improved approaches permit access to information through user interaction with a series of menus. The menus within the series of menus are interrelated and contain words or phrases. A phrase, sentence or question is constructed from the user interaction with the series of menus. The resulting phrase, sentence or question can be processed to access and retrieve appropriate information. The improved approaches avoid the need for users to enter words or text characters through tedious and frustrating use of a keypad (particularly when reduced in size).

23 Claims, 18 Drawing Sheets

METHOD AND SYSTEM FOR INFORMATION RETRIEVAL BASED ON MENU SELECTIONS

CROSS-REFERENCE TO RELATED APPLICATIONS

This application claims the benefit of: (i) U.S. Provisional Application No. 60/286,259, filed Apr. 24, 2001, and entitled "METHOD AND SYSTEM FOR INFORMATION RETRIEVAL BASED ON MENU SELECTIONS," which is hereby incorporated by reference herein; and (ii) U.S. Provisional Application No. 60/254,298, filed Dec. 8, 2000, and entitled "NATURAL QUERY INTERFACE BASED ON CONCEPT SELECTION," which is hereby incorporated by reference herein.

BACKGROUND OF THE INVENTION

1. Field of the Invention

The invention relates generally to information retrieval and, more particularly, to approaches for information retrieval.

2. Description of the Related Art

The information age has led to an environment where information access is becoming increasingly important. Various challenges result from so many people accessing information. Further exacerbating the challenges, business entities (such as corporations) typically have their information in many different formats, and different people with different skill sets access the information using different information devices. The information devices can be wired or wireless. Currently, more and more people are trying to get access to information through wireless means.

Information devices, e.g., information appliances, can access information through various different types of user interfaces. The most common type of user interface is a keypad that is integral with the information device. Such keypads for portable information devices are typically reduced-size keypads that allow for the entry of individual alphanumeric characters (i.e., 0-9, A-Z, *, #). Text entry is particularly tedious with reduced-size keyboards because each button is not only physically small but also ambiguous and thus requires that the user enter multiple key presses to precisely identify each character to be entered.

Another type of user interface relies on voice recognition to receive user input. Presently, voice recognition is not mature enough for pervasive use. In addition, voice recognition approaches are not appropriate for many applications or situations. Still another type of user interface relies on handwriting recognition. For example, certain personal digital assistants use handwriting as a user interface. This can be a versatile approach. However, such technologies are not so well developed as to allow one to write quickly, while still accurately recognizing the handwriting.

Yet still another type of user interface uses one or a series of predetermined menus that a user interacts with to make selections using a pointing mechanism or using data entry keys or buttons. For example, NTT DoCoMo of Japan has been quite successful with a mobile telephone that uses such a user interface for wireless Internet access. Typically, out of a user menu of a fixed number of choices, a user selects one. For example, a pull-down menu can be displayed, and the user can select one element out of the menu being displayed. Additional detailed menus can further refine the user's choice. In general, this type of user interface is inflexible and offers only a limited number of choices. For example, there may be seven top level choices, each with a limited number of sub-choices. Once you pick one of the sub-choices, you may be directed to receive a webpage by wireless means. The menus utilized are static and lack intelligence. As a result, conventional user interfaces that use menus are not suitable for general information access.

It should have been apparent from the foregoing that there is a need for improved approaches to access information from information appliances.

SUMMARY OF THE INVENTION

The present invention pertains to improved approaches to access information. In one embodiment, the approaches permit access to information through user interaction with a series of menus. The menus within the series of menus can be interrelated and contain words or phrases. A phrase, sentence or question can be constructed from the user interaction with the series of menus. The resulting phrase, sentence or question can be processed to access and retrieve appropriate information. The inventive approaches avoid the need for users to enter words or text characters through tedious and frustrating use of a keypad (particularly when reduced in size).

The invention can be implemented in numerous ways including, a method, system, apparatus, device, and a computer readable medium. Several embodiments of the invention are discussed below.

As a method for formulation of queries for use in accessing information from a knowledge base, one embodiment of the invention includes at least the operations of: displaying a first menu list of words or phrases; receiving a first selection of at least one of the words or phrases in the first menu list; and obtaining a second menu list of words or phrases based on the first selection of at least one of the words or phrases in the first menu list.

As a method for facilitating user input in a mobile computing device having a display and at least one user input button, one embodiment of the invention includes at least the operations of: receiving a series of user word or phrase menu selections, the series of user word or phrase menu selections being associated with a series of menus that are presented on the display; and constructing one or more phrases, sentences or questions from the series of user word or phrase menu selections.

As a method for retrieving information from a knowledge base for a user, one embodiment of the invention includes at least the operations of: constructing a natural language query from a series of user word or phrase menu selections, the series of user word or phrase menu selections being associated with a series of menus that are presented to the user; processing the natural language query to obtain a response from the knowledge base; and displaying the response the user.

As a method for retrieving pertinent information from a data source for a user, one embodiment of the invention includes at least the operations of: displaying an initial menu of words or phrases; receiving an initial user menu selection of at least one of the words or phrases of the initial menu; obtaining a subsequent menu of words or phrases based on the initial user menu selection; displaying the subsequent menu of words or phrases; receiving a subsequent user menu selection of at least one of the words or phrases of the subsequent menu; displaying an initial query in accordance with at least the subsequent user menu selection; determining whether additional user menu selections are desired or needed; repeating the obtaining operation through the displaying operation until the determining operation determines that no additional user menu selections are desired or needed, wherein an updated query is displayed by the displaying operation in accordance with at least the plurality of the subsequent user menu selections; obtaining a response to the updated query; and presenting the response to the user.

As a computer readable medium including at least computer program code for composing phrases, sentences or questions, one embodiment of the invention comprises: computer program code for displaying a first menu list of words or phrases; computer program code for receiving a first selection of at least one of the words or phrases in the first menu list; and computer program code for obtaining a second menu list of words or phrases based on the first selection of at least one of the words or phrases in the first menu list.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches to access information. In one embodiment, the approaches permit access to information through user interaction with a series of menus. The menus within the series of menus can be interrelated and contain words or phrases. A phrase, sentence or question can be constructed from the user interaction with the series of menus. The resulting phrase, sentence or question can be processed to access and retrieve appropriate information. The inventive approaches avoid the need for users to enter words or text characters through tedious and frustrating use of a keypad (particularly when reduced in size).

In another embodiment, the series of menus are sequentially presented on a display screen of an information appliance. As each user selection is made from menu items being displayed, the phrase, sentence or question being formed can be updated to reflect the word or phrase corresponding to the user selection. The invention provides a flexible, general purpose way for users to easily access large amounts of information.

The inventive approaches are particularly well suited for use on information devices, namely, devices that access information locally or remotely. Often, the information devices are mobile or wireless devices and thus can be referred to as mobile computing devices or wireless client devices. Examples of information devices are numerous, including: Personal Digital Assistants (PDAs), mobile telephones, wearable computers, hand-held computers, etc.

Embodiments of this aspect of the invention are discussed below with reference to FIGS. 1-9. However, those skilled in the art will readily appreciate that the detailed description, given herein with respect to these figures is for explanatory purposes as the invention extends beyond these limited embodiments.

Figure 1:
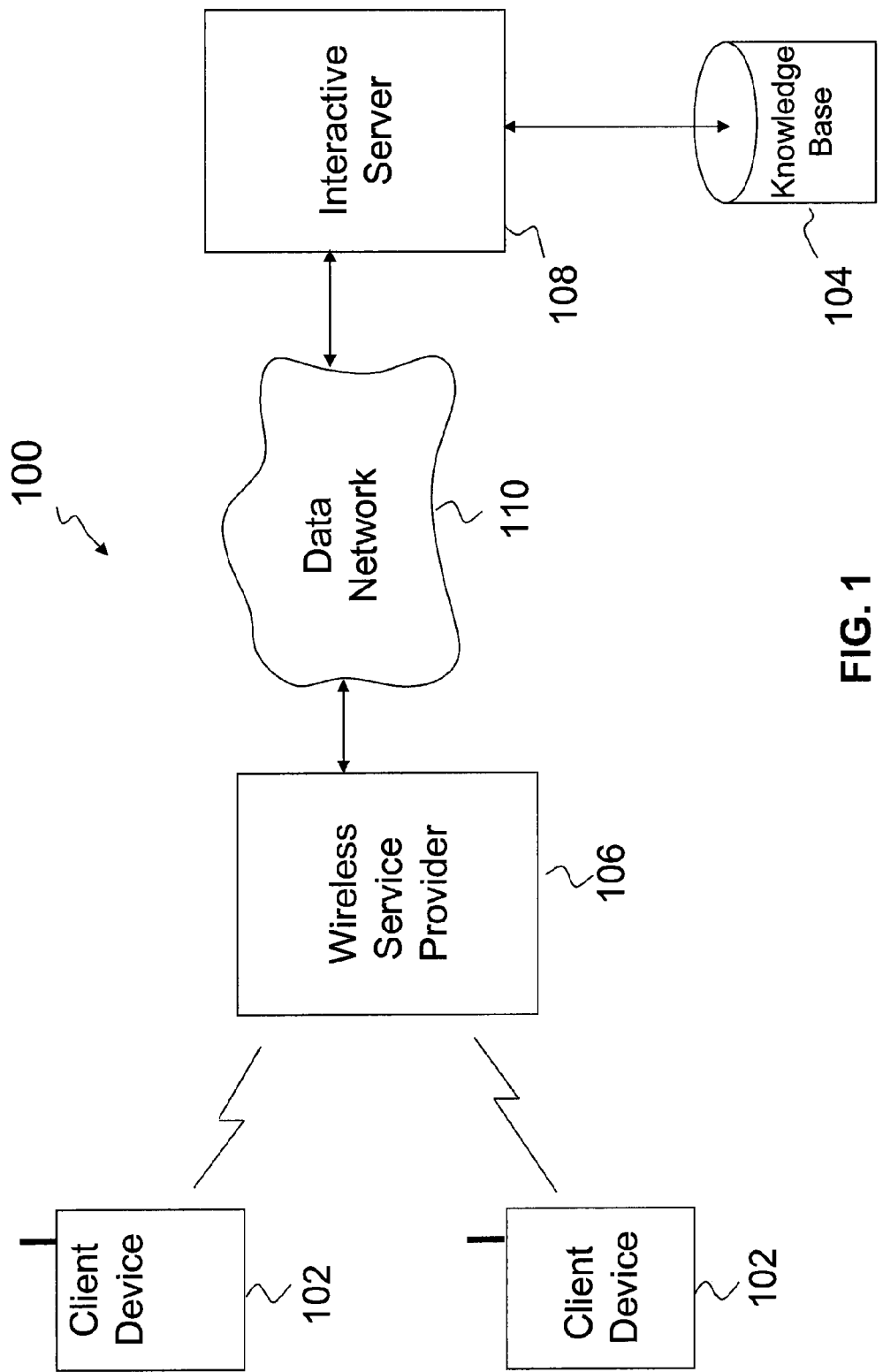
FIG. 1 is a block diagram of a wireless knowledge retrieval system according to one embodiment of the invention.

FIG. 1 is a block diagram of a wireless knowledge retrieval system 100 according to one embodiment of the invention. The wireless knowledge retrieval system 100 enables a plurality of client devices 102 to access a remotely located knowledge base 104 (database). The client devices 102 are generally wireless or mobile computing devices, such as mobile telephones, Personal Digital Assistants, hand-held computers, etc.

More specifically, a user, through interaction with the client device 102, can make selections of words or phrases to construct a sentence, phrase or question. The resulting phrase, sentence or question can then be wirelessly transmitted to a wireless service provider (or wireless gateway) 106. The wireless service provider 106 receives the phrase, sentence or question and forwards it to an interactive server 108 via a data network 110. As an example, the data network can comprise the Internet. The interactive server 108 processes the phrase, sentence or question to yield a knowledge base query. The knowledge base query is then executed to locate and retrieve requested information from the knowledge base 104. The interactive server 108 then produces a response including the retrieved knowledge (information) from the knowledge base 104. The response is then directed back to the requesting client device 102 via the data network 110 and the wireless service provider 106.

The phrase, sentence or question that is formed at the client device 102 can be formed through use of a series of menus. The series of menus enable users of the client device 102 to efficiently author phrases, sentences or questions. These phrases, sentences or questions are also referred to herein as constructed queries (CQ). In one embodiment, the constructed queries (CQ) can have a natural language format.

According to one embodiment of the invention, a menu-driven approach is utilized to support efficient end-user authorship of application-specific strings of words, phrases, or sentences to enable more efficient human language-based communication with computing devices such as wireless computing devices. In other words, a user at the client device 102 is able to construct a phrase, sentence or question without entering each character of each word, which is particularly tedious on small scale computing devices that include only small keypads (or keyboards). Instead, according to one embodiment of the invention, the user interacts with menus to select words or phrases that are appropriate given the context of the application, prior menu selections, and/or user preferences.

Figure 2A:
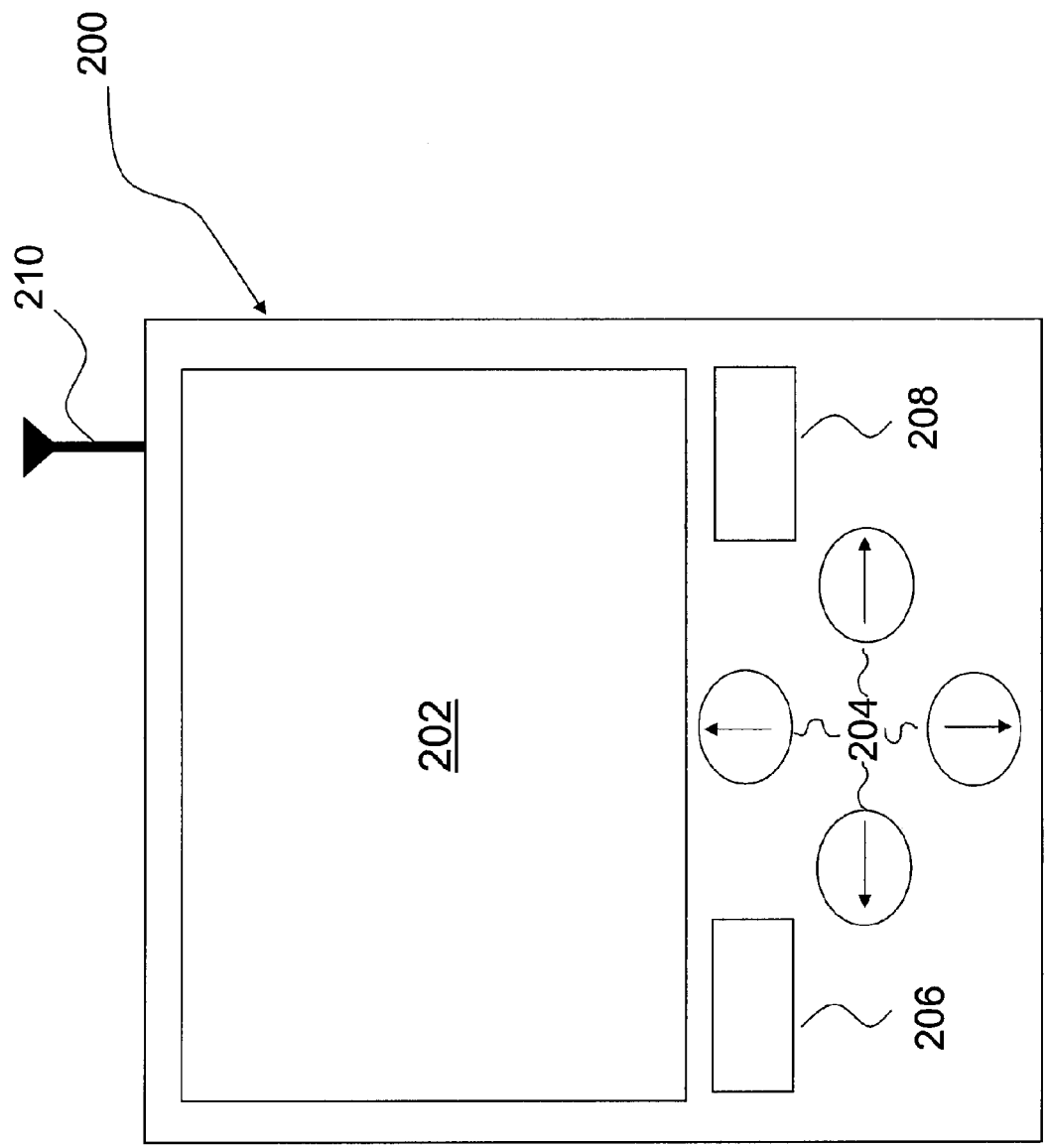
FIG. 2A is a diagram of one embodiment of a wireless client device suitable for use with the present invention.

Although the client devices 102 illustrated in FIG. 1 can take many forms, configurations and purposes, FIG. 2A is a diagram of one embodiment of a wireless client device 200 suitable for use with the present invention. The wireless client device 200 includes a display 202 for displaying text and/or graphics to a user of the wireless client device 200, a set of navigation keys 204, buttons 206 and 208, and an antenna 210. The various menus (or windows) utilized in forming a phrase, sentence or question are presented on the display 202 of the wireless client device 200. The menus or windows utilized can take many different forms. FIGS. 7A-7M, which are discussed below, pertain to a series of menus or windows that can be presented on the display 202 in accordance with one exemplary embodiment of the invention.

Once a menu is displayed, the user of the wireless client device 200 can then interact with the wireless client device 200 to select one of the items listed within the displayed menu. Here, the user can interact with the wireless client device 200 in a variety of ways. As an example, the user can navigate through the items listed in the menus being displayed using the navigation keys 204 and then make a selection using buttons 206 or 208. The buttons 206 or 208 can have a fixed function. For example, the button 208 can pertain to an enter or select button. Alternatively, the buttons 206 and 208 can be referred to as "soft" buttons because their function can vary with application. As another alternative, the display 202 could allow for touch-screen or stylus-screen entry of selections as is well known in the art. As yet another alternative, voice commands could be recognized by the wireless client device 200 and used to navigate through and select items from the menus. Although not shown in FIG. 2A, the wireless client device 200 can optionally include a keypad, namely a reduced-size keypad for alphanumeric inputs.

Figure 2B:
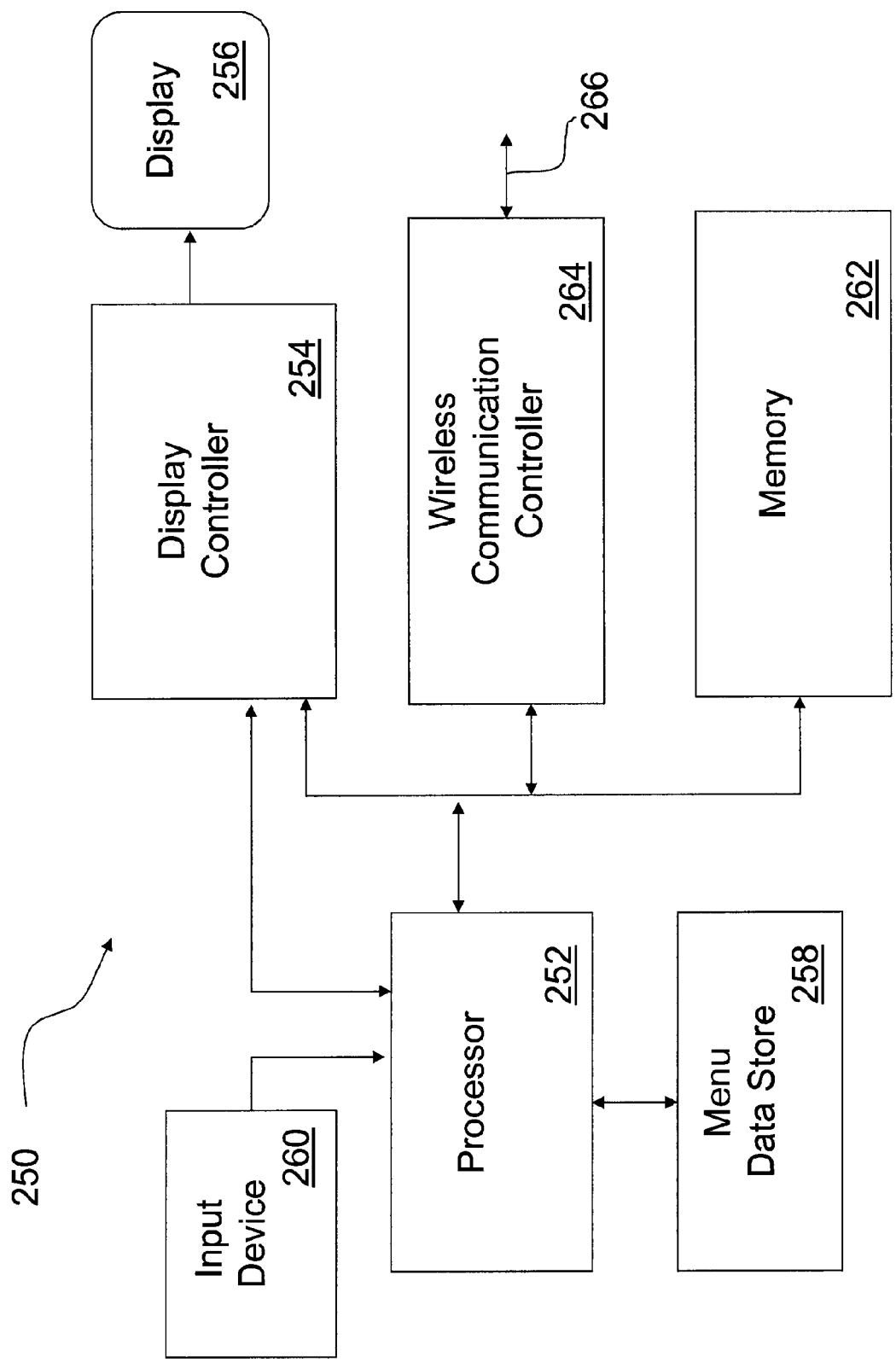
FIG. 2B is a block diagram of a wireless client architecture suitable for use with a wireless client device.

FIG. 2B is a block diagram of a wireless client architecture 250 suitable for use with a wireless client device, such as the client device 102 illustrated in FIG. 1 or the wireless client device 200 illustrated in FIG. 2A. However, it should be recognized that various different architectures can be used by the client device 102 or the wireless client device 200.

The wireless client architecture 250 includes a processor 252 (also referred to as a central processing unit or a microcontroller) that interacts with a display controller 254 to produce text and/or graphics on a display 256. In accordance with one embodiment of the invention, the wireless client architecture 250 includes a menu data store 258 (database) that stores a hierarchy of menus that can be displayed on the display 256 such that a user can interact with an input device 260 to make selections from the menus. The menus can be predefined or dynamically determined. The input device 260 can, for example, be a keypad (namely, a reduced-size keypad), a navigation and/or select button, or a pointing device. These selections are then used in formulating phrases, sentences or questions. The wireless client architecture 250 also includes a memory 262. The memory 262 can provide volatile data storage and/or non-volatile data storage. Non-volatile data storage is typically used to store user preferences and computer program code to be executed by the processor 252. Volatile data storage is typically provided for use by the processor 252, the display controller 254, or a wireless communication controller 264. The wireless communication controller 264 couples to a wireless network over a wireless link 266. The wireless communication controller 264 allows data to be transmitted between the wireless client architecture 250 and other remotely located computing devices (e.g., wireless service provider 106).

This invention can also facilitate the dynamic creation of the menus by retrieving the appropriate menu items for a next menu from a menu data store (e.g., database or knowledge base). Still further, the menu data store, and thus the menu items stored therein, can be stored locally on a client device or remotely on a server device. In one embodiment, the menu data store is a menu database that stores the concepts and menu items for the various menus. For example, the menu database can be the menu database 258 illustrated in FIG. 2B. In other embodiment, the menu data store can be a separate database or can be combined with a content database or knowledge base.

Figure 3A:
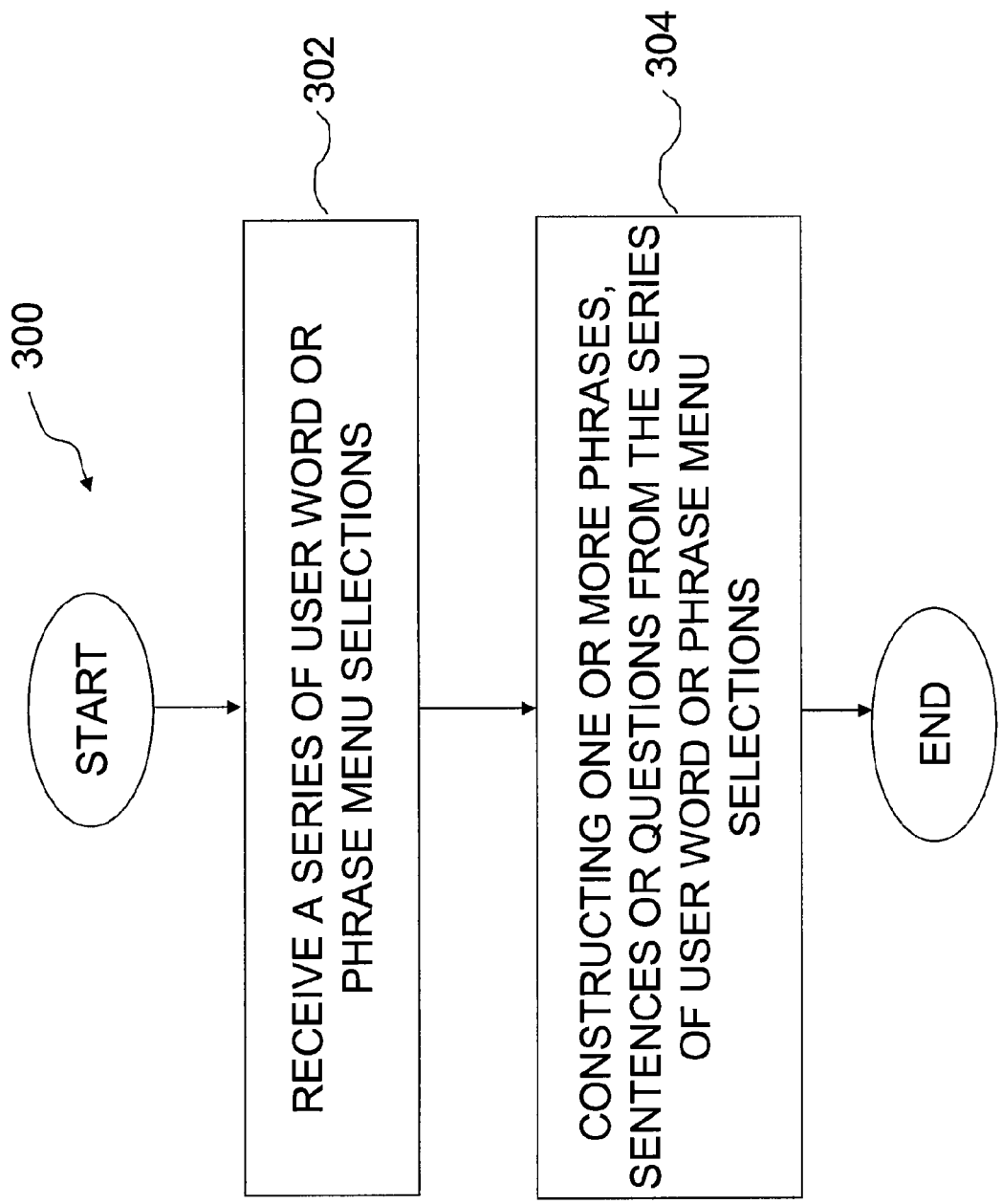
FIG. 3A is a basic flow diagram of menu-based input processing according to one embodiment of the invention.

FIG. 3A is a basic flow diagram of menu-based input processing 300 according to one embodiment of the invention. The menu-based input processing 300 is, for example, performed on the client device 102 illustrated in FIG. 1 or the wireless client device 200 illustrated in FIG. 2A. The menu-based input processing 300 can also be performed on a server device, such as the interactive server 108 illustrated in FIG. 1.

The menu-based input processing 300 initially receives 302 a series of user word or phrase menu selections. Typically, a user of a client device would be presented with a series of menus containing words or phrases, and then the user would make word or phrase selections with respect to the menus. After the series of user word or phrase menu selections have been received 302, one or more phrases, sentences or questions can be constructed 304 from the series of user word or phrase menu selections.

Figure 3B:
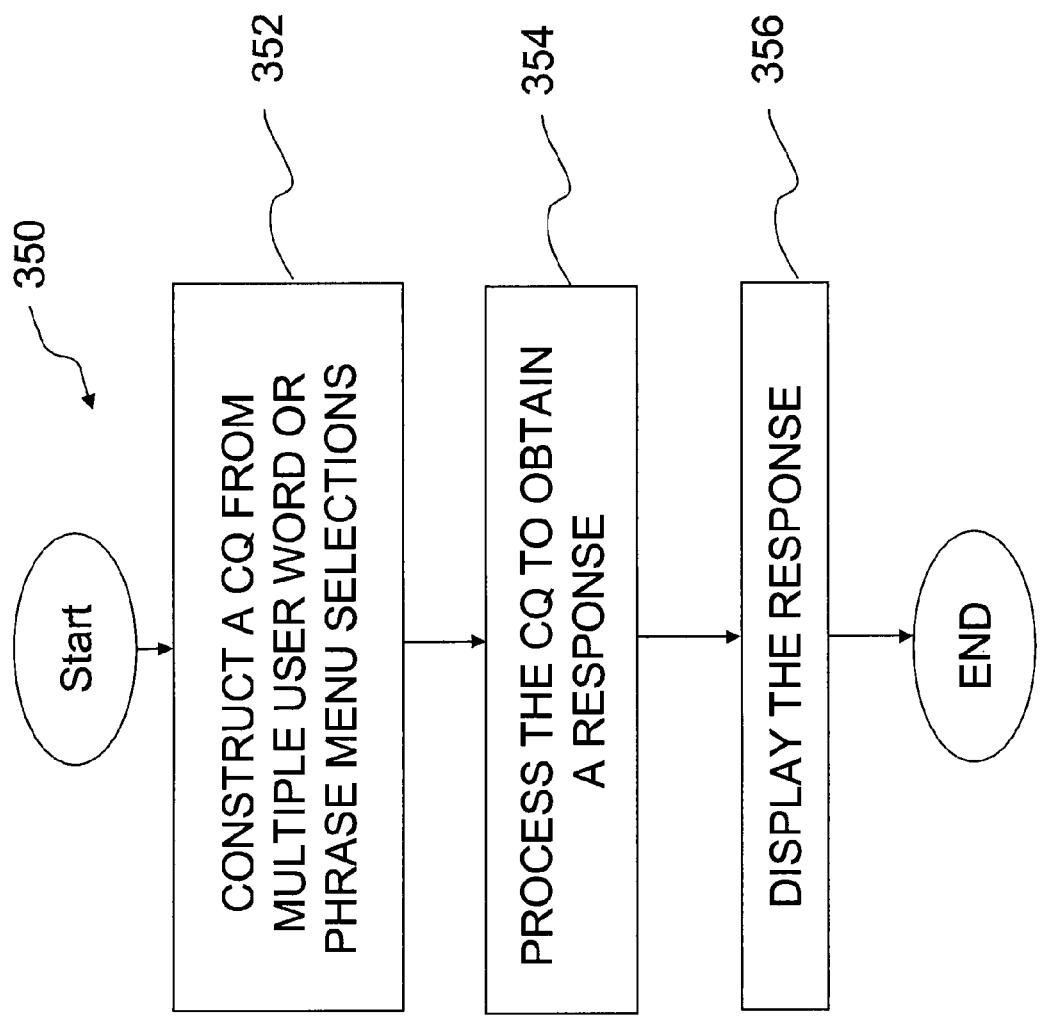
FIG. 3B is a flow diagram of information retrieval processing according to one embodiment of the invention.

FIG. 3B is a flow diagram of information retrieval processing 350 according to one embodiment of the invention. The information retrieval processing 300 can be performed on a client device or server device, or a combination of both.

The information retrieval processing 350 initially constructs 352 a query (CQ) from multiple user word or phrase menu selections. Through intelligent creation and presentation of menus, a user is able to interact with a series of menus to make the word or phrase selections. These selections are then used to construct 352 the CQ. Next, the CQ is processed 354 to obtain a response. Typically, the processing 354 of the CQ corresponds to obtaining information responsive to the CQ. In one embodiment, the CQ is converted into a knowledge-based query (e.g., Structured Query Language (SQL) query) and then executed on a knowledge base to retrieve information pertinent to the CQ. The retrieved information is then utilized in producing the response. Once the response has been obtained, the response is displayed 356. Typically, the response is displayed to the user that initially requested the information associated with the response. For example, the response would be displayed 356 to the user that made the menu selections that yielded the CQ. However, it should be noted that, if desired, the response could be delivered to a different destination.

Figure 4:
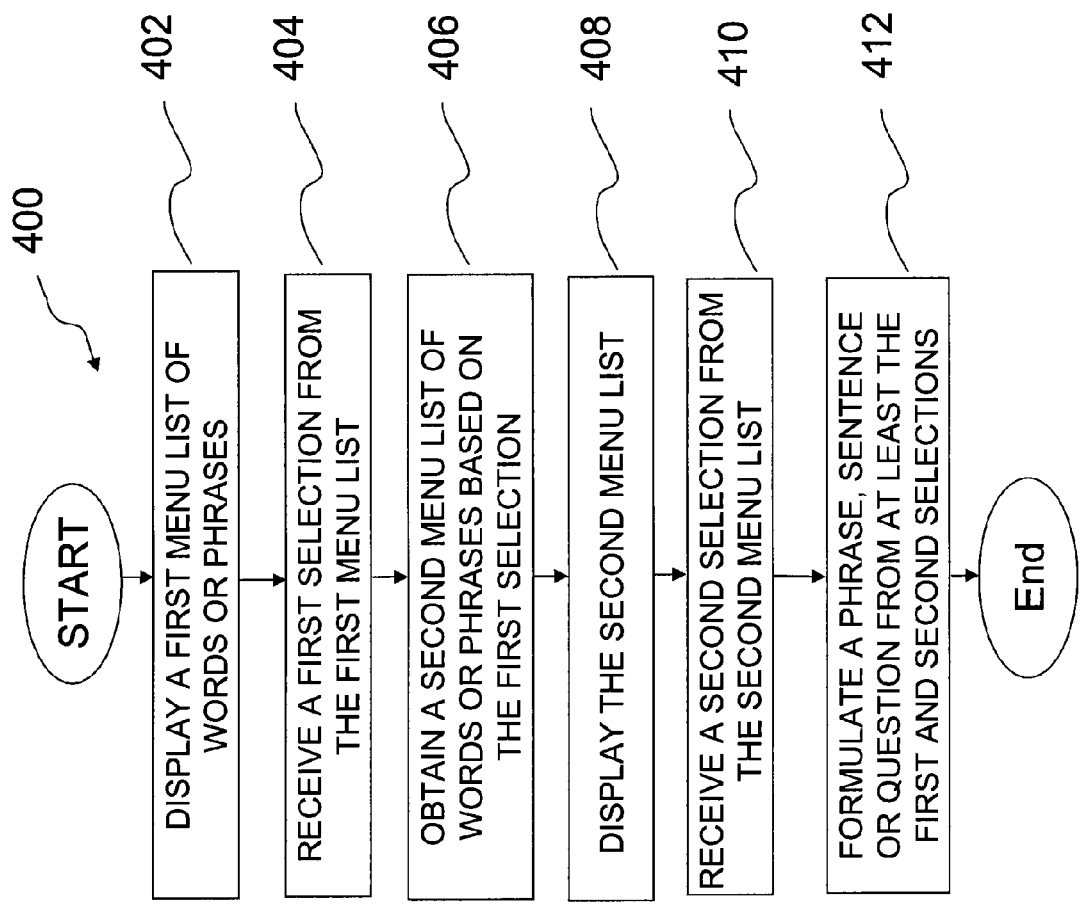
FIG. 4 is a flow diagram of menu-based input processing according to one embodiment of the invention.

FIG. 4 is a flow diagram of menu-based input processing 400 according to one embodiment of the invention. The menu-based input processing 400 can, for example, represent a more specific implementation of the menu-based input processing 300 illustrated in FIG. 3A or can represent one implementation of the construction operation 352 of the information retrieval processing 350 illustrated in FIG. 3B.

The menu-based input processing 400 initially displays 402 a first menu list of words or phrases. Here, the first menu list is displayed to a user via a display, such as the display 202 illustrated in FIG. 2A. Next, a first selection is received 404 from the first menu list. Here, the first menu list contains a plurality of items from which a user can make a selection. The first selection pertains to a user's selection of one of the items from the first menu list. The user is able to make such selections through use of an input means, such as the input device 260 illustrated in FIG. 2B.

After the first selection has been received 404, a second menu list of words or phrases is obtained 406 based on the first selection. In other words, the entries within the second menu list, namely its words or phrases, are chosen dependent upon the entry within the first menu list that was selected as the first selection. The second menu list is then displayed 408. After the second menu list has been displayed 408, a second selection from the second menu list is received 410. Here, the user selects one of the items from the second menu list being displayed as the second selection. Thereafter, a phrase, sentence or question is formulated 412 from at least the first and second selections. The phrase, sentence or question can have a natural language format. Here, in general, the first and second selections are used within the phrase, sentence or question that is formulated 412. Other words or phrases may also be added such that the phrase, sentence or question can be generally grammatically and logically correct. The invention can facilitate the creation or formulation of complex sentences, questions or natural language queries and a series of menus and menu selections can be utilized to produce the same. Hence, the invention is not limited to the simplified situation in which only first and/or second menu lists are utilized as shown in FIG. 4.

Figure 5A:
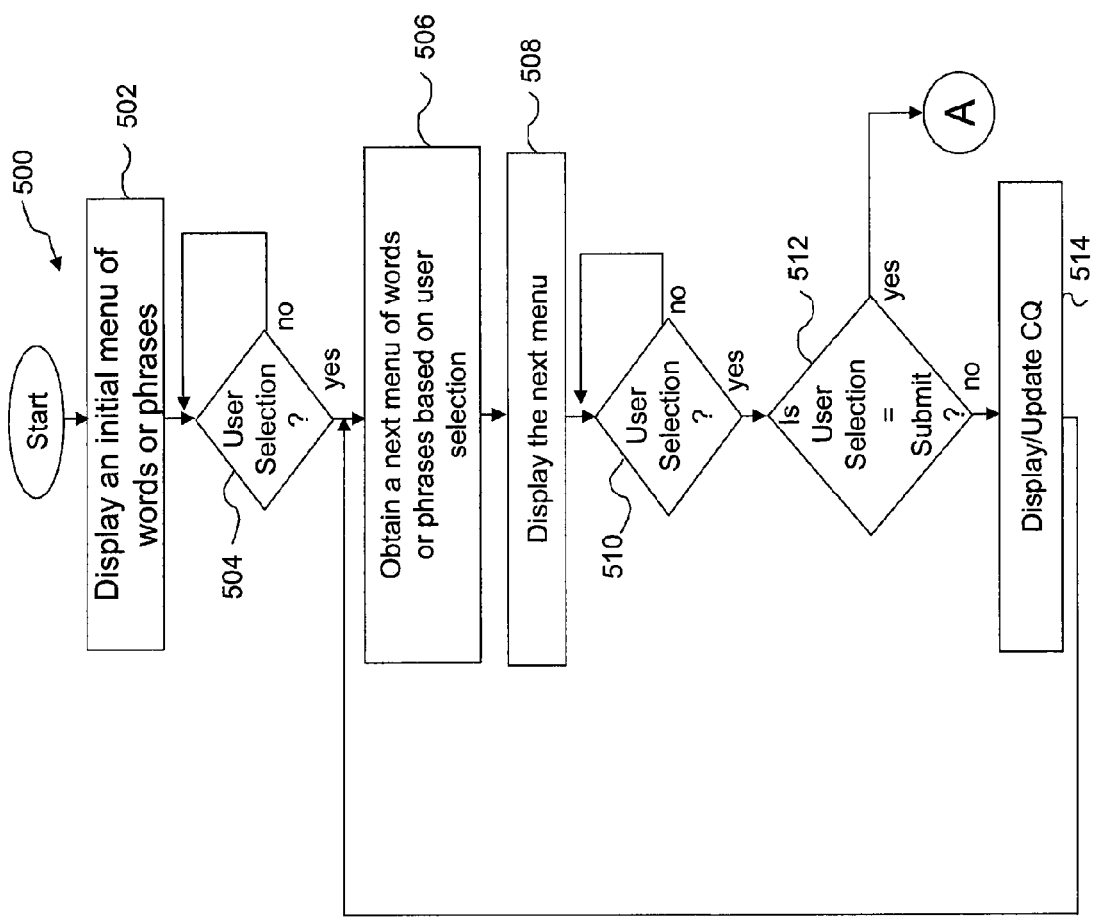
FIGS. 5A and 5B are flow diagrams of Constructed Query (CQ) builder client processing according to one embodiment of the invention.
Figure 5B:
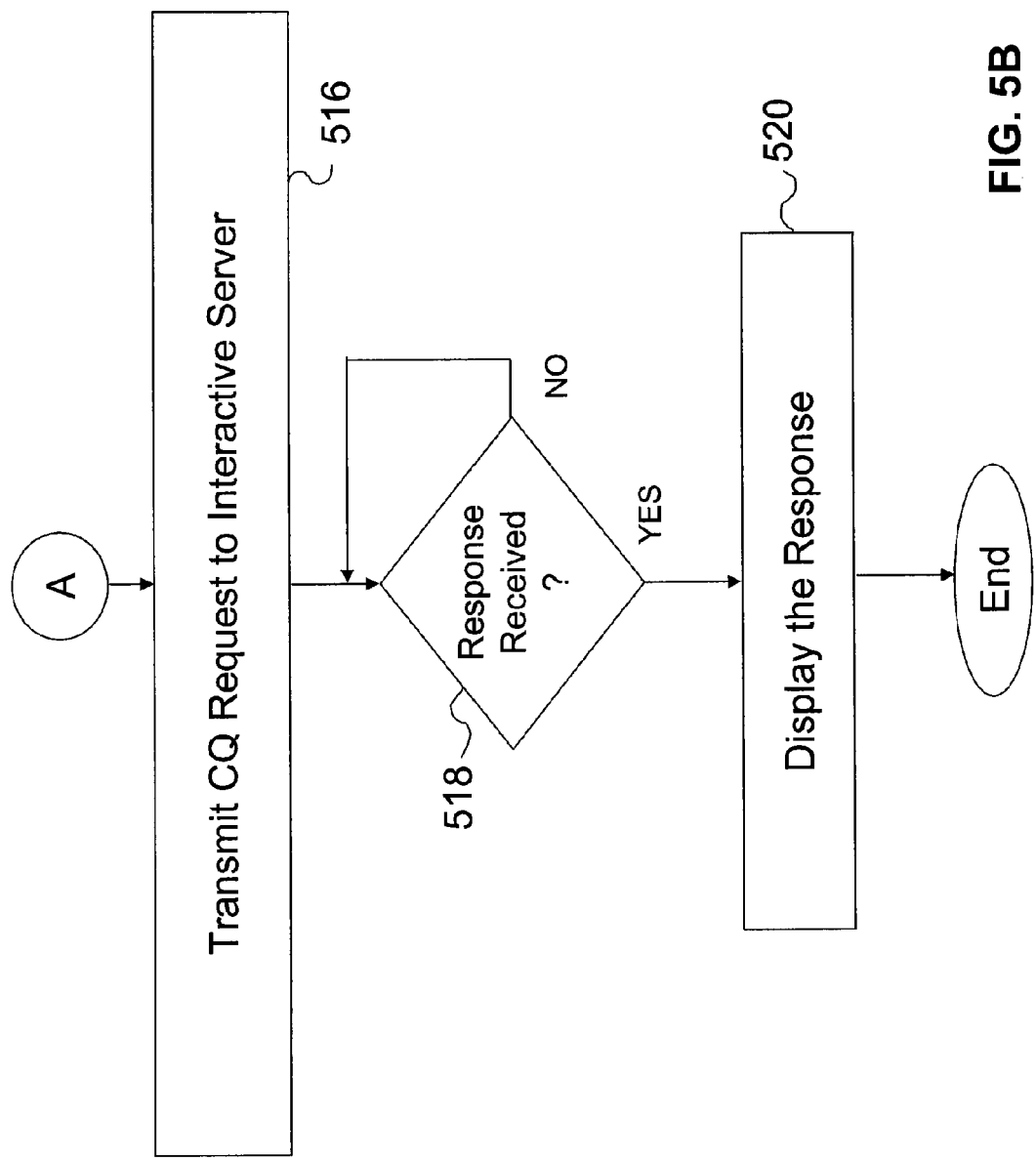

FIGS. 5A and 5B are flow diagrams of a Constructed Query (CQ) builder client processing 500 according to one embodiment of the invention. The CQ builder client processing 500 can build a CQ and execute or process the CQ to acquire responsive information. The CQ builder client processing 500 is, for example, performed by a client device, such as the client device 102 illustrated in FIG. 1.

The CQ builder client processing 500 initially displays 502 an initial menu of words or phrases. Here, the initial menu is displayed on a display associated with the client device. In one embodiment, the words or phrases for the initial menu can pertain to concepts. The concepts can provide a context for which the CQ will be derived from subsequent menu selections. Next, a decision 504 determines whether a user selection has been received. When the decision 504 determines that a user selection has not yet been received, the CQ builder client processing 500 awaits such a selection. Once the decision 504 determines that a user selection has been received, a next menu of words or phrases is obtained 506 based on the user selection. In other words, the user makes a selection with respect to a current menu and that selection is used in obtaining the appropriate words or phrases for the next menu. The next menu is then displayed 508.

Next, a decision 510 determines whether a user selection has been made with respect to the next menu that is being displayed 508. When the decision 510 determines that a user selection has not yet been made, the CQ builder client processing 500 awaits such a selection. On the other hand, when the decision 510 determines that a user selection with respect to the next menu has been made, then a decision 512 determines whether the user selection is a submit request. The submit request is a request by the user to submit the CQ such that information associated with the CQ can be returned.

When the decision 512 determines that the user selection is not a submit request, then the CQ can also be displayed 514. Here, the portion of the CQ formed so far through prior user selections is displayed 514. This allows a user to visually see the CQ being created piece by piece as each menu selection is made. Hence, with subsequent menu selections, the CQ being displayed is updated 514. Following the operation 514, the CQ builder client processing 500 returns to repeat the operation 506 and subsequent operations so that additional menus can be presented to users who make additional menu selections which are used to further update the CQ.

Alternatively, when the decision 512 determines that the user selection is a submit request, the CQ builder client processing 500 understands that the CQ is completed and should now be processed. In this regard, a CQ request is transmitted 516 to an interactive server. The interactive server can, for example, be the interactive server 108 illustrated in FIG. 1. The CQ request is then processed at the interactive server to acquire the requested information and then to return a response. Hence, following the operation 516, the CQ builder client processing 500 awaits a response from the interactive server. A decision 518 thus determines whether a response has been received. When the decision 518 determines that a response has not yet been received, then the CQ builder client processing 500 awaits such a response. Once the decision 518 determines that a response has been received, then the response is displayed 520. Here, for example, the response can be displayed on the display of the client device. For example, the response can be displayed on the display 202 of the client device 200 illustrated in FIG. 2A.

According to one embodiment, the CQ request that is transmitted 516 to the interactive server is a request for a response to the CQ that has been built. The format of the request can vary. In one implementation, such as contemplated by FIG. 5B, the CQ request is a request which sends the CQ to the interactive server. In another implementation, the CQ is processed at the client device to produce a query (e.g., SQL format) which is then sent to the interactive server as or with a request. In any case, the request can utilize any of a variety of protocols, such as HyperText Transfer Protocol (HTTP), Wireless Application Protocol (WAP), etc.

Figure 6:
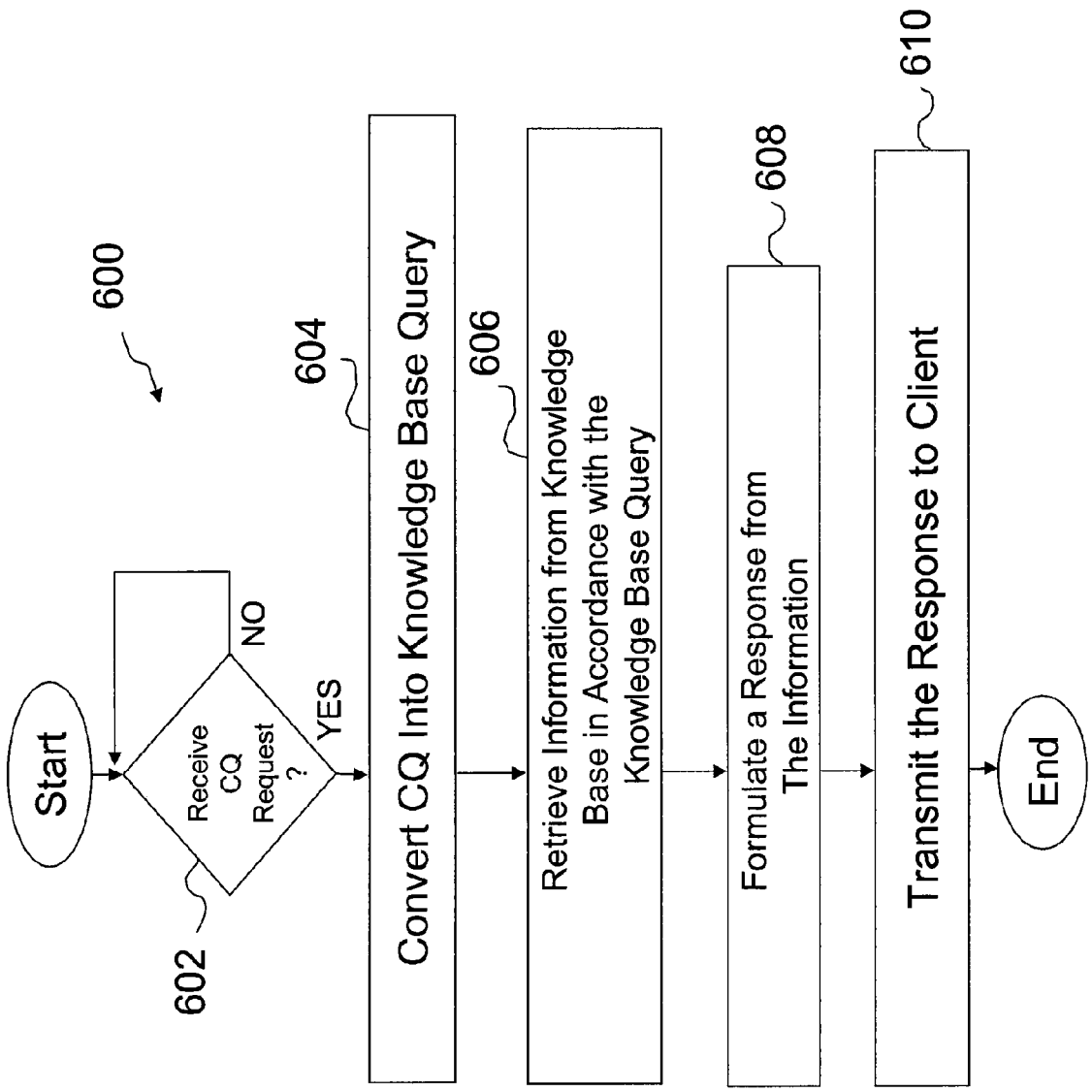
FIG. 6 is a flow diagram of CQ server processing according to one embodiment of the invention.

FIG. 6 is a flow diagram of CQ server processing 600 according to one embodiment of the invention. The CQ server processing 600 is, for example, performed by a server, such as the interactive server 108 illustrated in FIG. 1. The CQ server processing 600 interacts with the operations 516 and 518 of the CQ builder client processing 500 illustrated in FIG. 5B.

The CQ server processing 600 can begin with a decision 602 that determines whether a CQ request has been received. Here, the CQ server processing 600 is awaiting a CQ request from a client device. When the decision 602 determines that a CQ request has not yet been received from a client device, the CQ server processing 600 awaits such a CQ request. On the other hand, when the decision 602 determines that a CQ request has been received, the CQ provided with or accompanying the CQ request can be converted 604 into a knowledge base query. The CQ request includes a CQ as well as network transportation information as required by a communication protocol. Next, information is retrieved 606 from a knowledge base in accordance with the knowledge base query. In other words, the knowledge base query is executed or processed with respect to a knowledge base so that the appropriate information can be retrieved therefrom. The knowledge base can, for example, pertain to the knowledge base 104 illustrated in FIG. 1. Next, a response is formulated 608 from the information that was retrieved 606 from the knowledge base. The response can be packaged or configured in an appropriate manner for the one or more networks, wired or wireless, that the response traverses in reaching the client. Typically, the response configures to a network protocol or to a type of client device. After the response is formulated 608, the response is transmitted 610 to the client.

FIGS. 7A-7M pertain to a series of menus or windows that can be presented on a display in accordance with one exemplary embodiment of the invention.

Figure 7A:
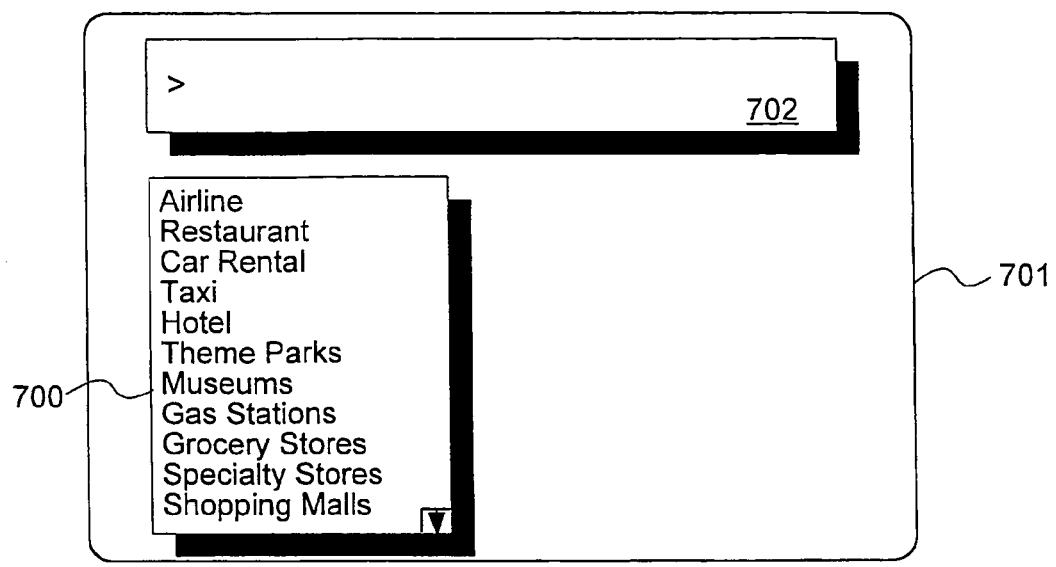
FIGS. 7A-7M pertain to a series of menus or windows that can be presented on a display in accordance with one exemplary embodiment of the invention.

FIG. 7A illustrates a first menu 700 and a CQ window 702 presented on a display screen 701 of a computing device (e.g., client device). The first menu 700 contains a list of items from which a user may make a selection. In this example, the items in the first menu 700 pertain to concepts or contexts for creating a CQ. At this point, the CQ window 702 is empty because no selections from any menus have been made.

Figure 7B:
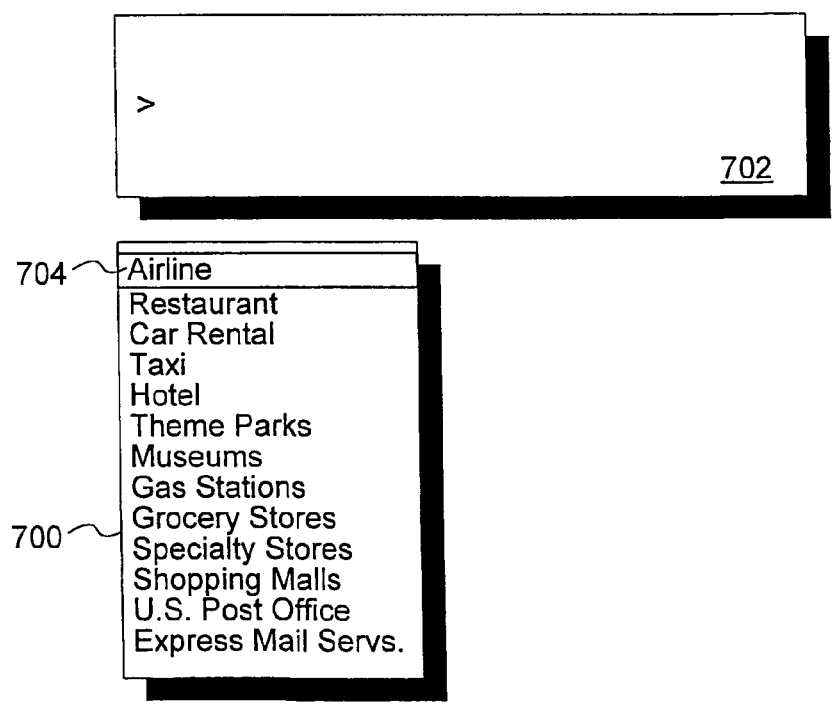

FIG. 7B illustrates the CQ window 702 and the first menu 700 as shown in FIG. 7A after a user has made a first selection 704. In this example, the user is designating the concept "Airline" as the first selection 704.

Figure 7C:
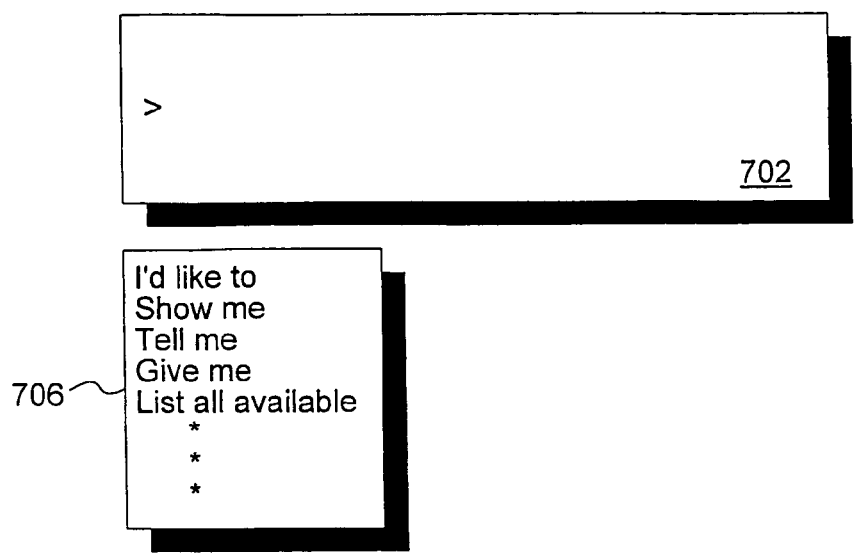

FIG. 7C illustrates the CQ window 702 and a second menu 706. The items within the second menu 706 have some association to the concept or item of the first selection 704. The items within the second menu 706 are also suitable initial phrases to begin the CQ being formed.

Figure 7D:
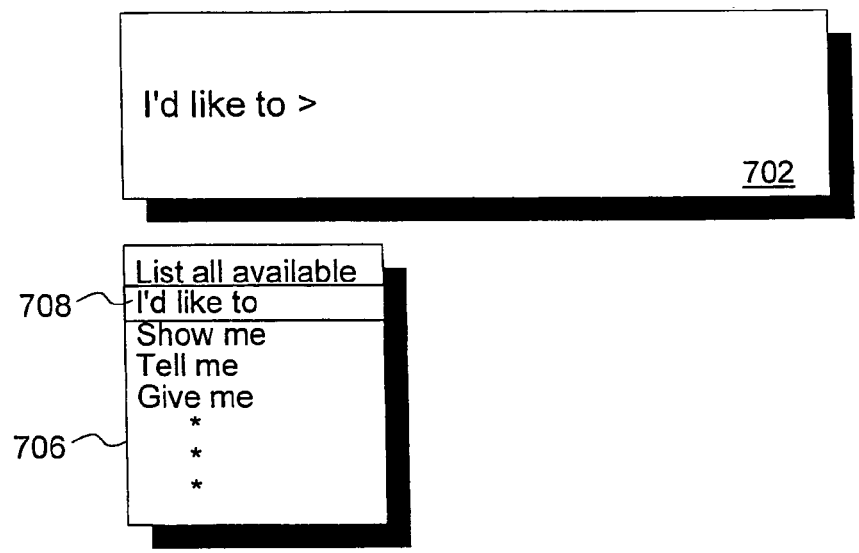

FIG. 7D illustrates the CQ window 702 and the second menu 706 as illustrated in FIG. 7C when the user is making a second selection 708. In this example, the user has selected the phrase "I'd like to" as the second selection 708. In this example, the second selection 708 forms an initial part of the CQ being built. Consequently, the CQ window 702 displays the phrase "I'd like to" after the user has made the second selection 708.

Figure 7E:
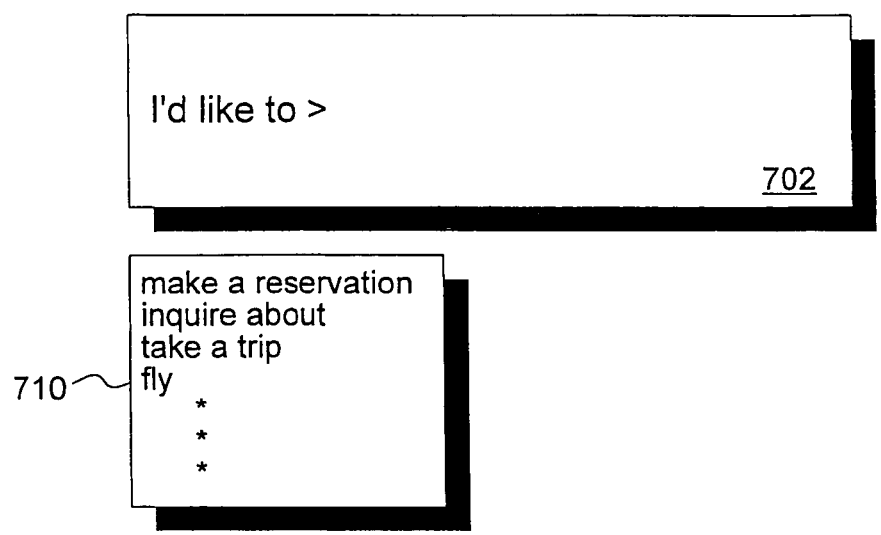

FIG. 7E illustrates the CQ window 702 and a third menu 710. The third menu 710 contains items that are associated with the second selection 708. Recall, in this example, the second selection indicated that the user liked to do something, and thus the items in the third menu 710 pertain to those things that the user would typically like to do, given the context provided by the first selection 704.

Figure 7F:
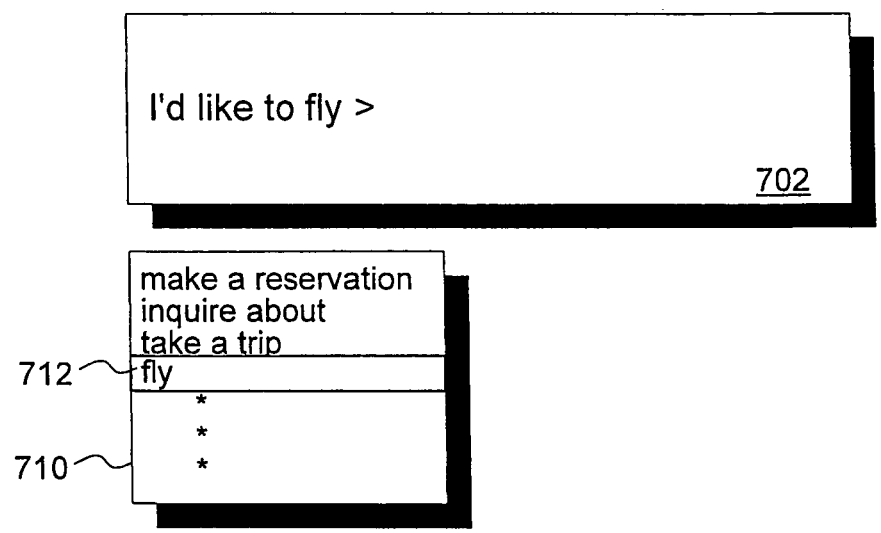

FIG. 7F illustrates the CQ window 702 and the third menu 710 when the user is making a third selection 712. In this example, the third selection pertains to the word "fly". Hence, the CQ being displayed in the CQ window 702 is updated to further include the word "fly". Accordingly, the updated CQ now being displayed in the CQ window 702 is "I'd like to fly".

Figure 7G:
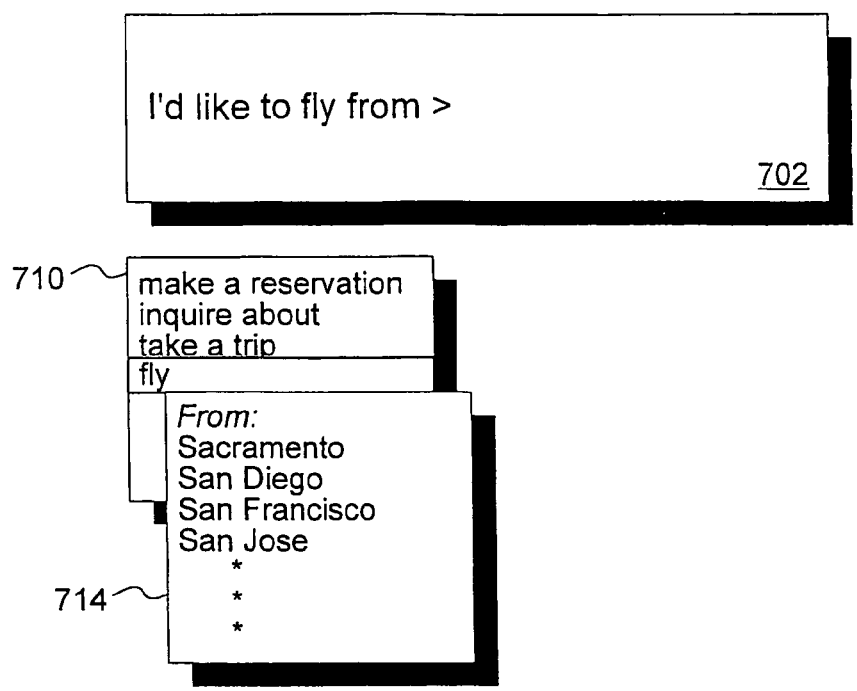

FIG. 7G illustrates the CQ window 702 and a fourth menu 714. The fourth menu 714 contains a series of items that are associated with the third selection 712. Typically, the items in the fourth menu 714 also are relevant given the context of the CQ set by the first selection 704. Here, in this example, the fourth menu 714 contains a list of destination cities from which the user would likely prefer to fly from. In FIG. 7G, the fourth menu 714 is displayed over a portion of the third menu 710 which continues to be displayed. Hence, the fourth menu 714 can overlap or cascade from some or all of the third menu 710. By continuing to display at least a portion of the third menu 710, the user may be able to more easily recall the state of the CQ as now formed.

Figure 7H:
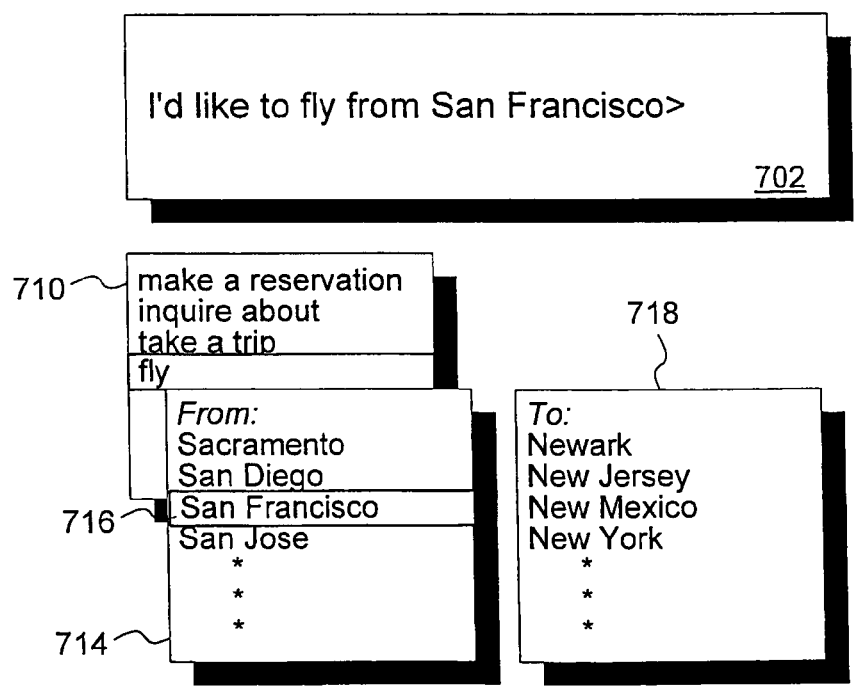

FIG. 7H illustrates the CQ window 702 and the fourth menu 714 displayed after the user has made a fourth selection 716. Here, in this example, the user has selected the city "San Francisco" as the fourth selection 716. As a result, the CQ being displayed in the CQ window 702 is updated to reference "San Francisco". Additionally, a fifth menu 718 can also be displayed. As illustrated in FIG. 7H, the fifth menu 718 can be displayed on the display while the third menu 710 and the fourth menu 714 remain displayed, though such is not necessary. The fifth menu 718 contains a list of destination cities where the user is likely to fly to.

Figure 7I:
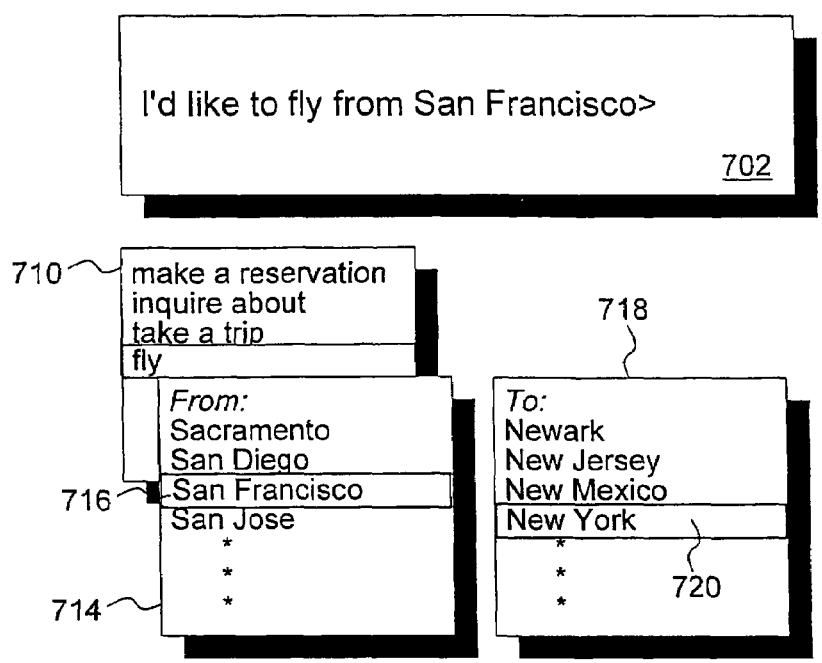

FIG. 7I illustrates the CQ window 702 and the fifth menu 718 as the user is making a fifth selection 720. Here, the fifth selection 720 pertains to the city "New York".

Figure 7J:
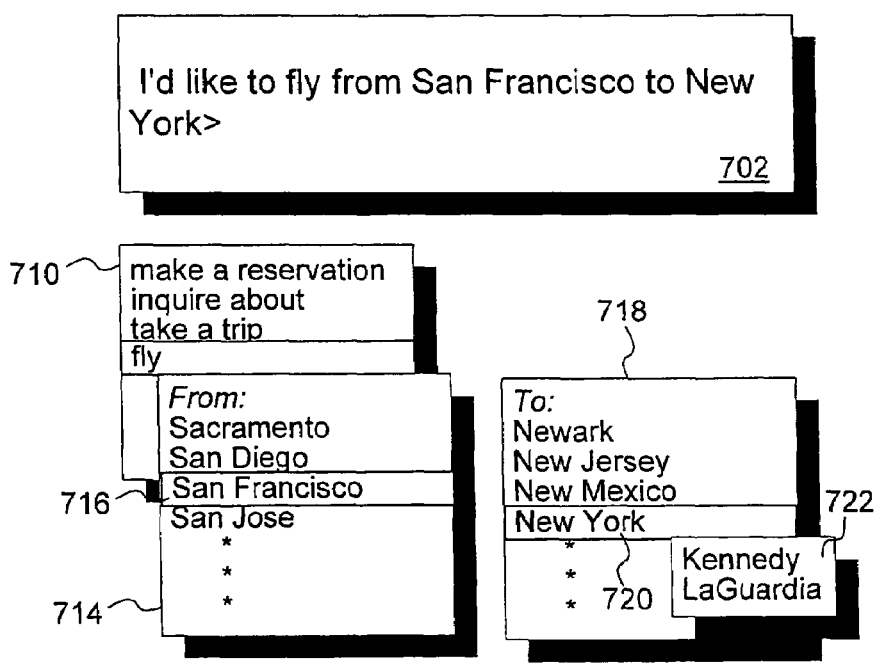
Figure 7K:
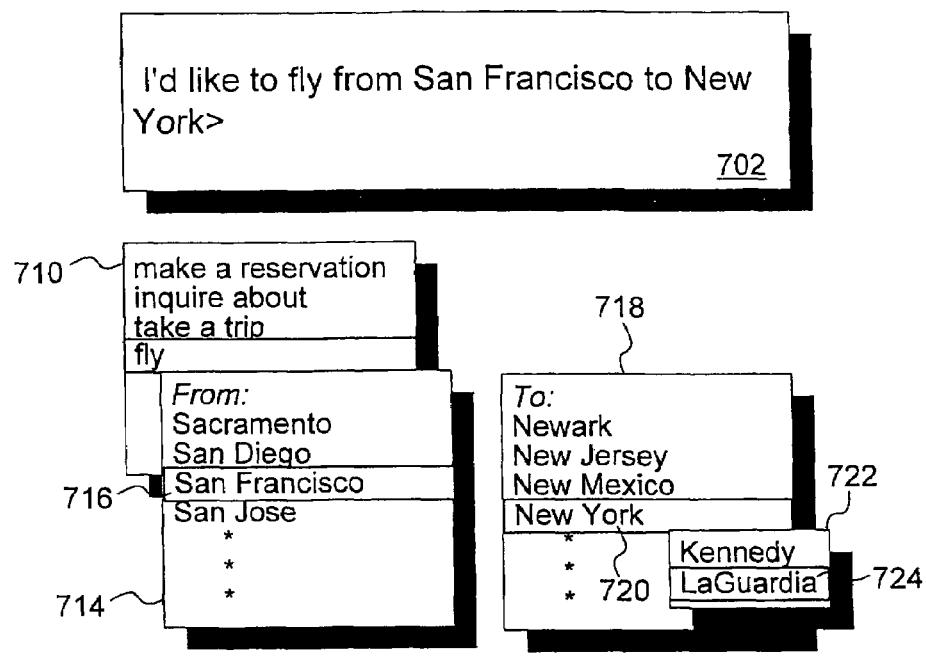

FIG. 7J illustrates the CQ window 702 and a sixth menu 722. The CQ displayed in the CQ window 702 is updated in accordance with the fifth selection 720. The third menu 710, the fourth menu 714 and the fifth menu 718 are also displayed in FIG. 7J, although such is not necessary. The sixth menu 722 lists the two airports in New York City. FIG. 7K illustrates the sixth menu 722 as the user is making a sixth selection 724. Here, the sixth selection pertains to "La Guardia" which is one of the major airports in New York City. The CQ being displayed in the CQ window 702 is also updated to now make reference to New York's La Guardia airport.

Figure 7L:
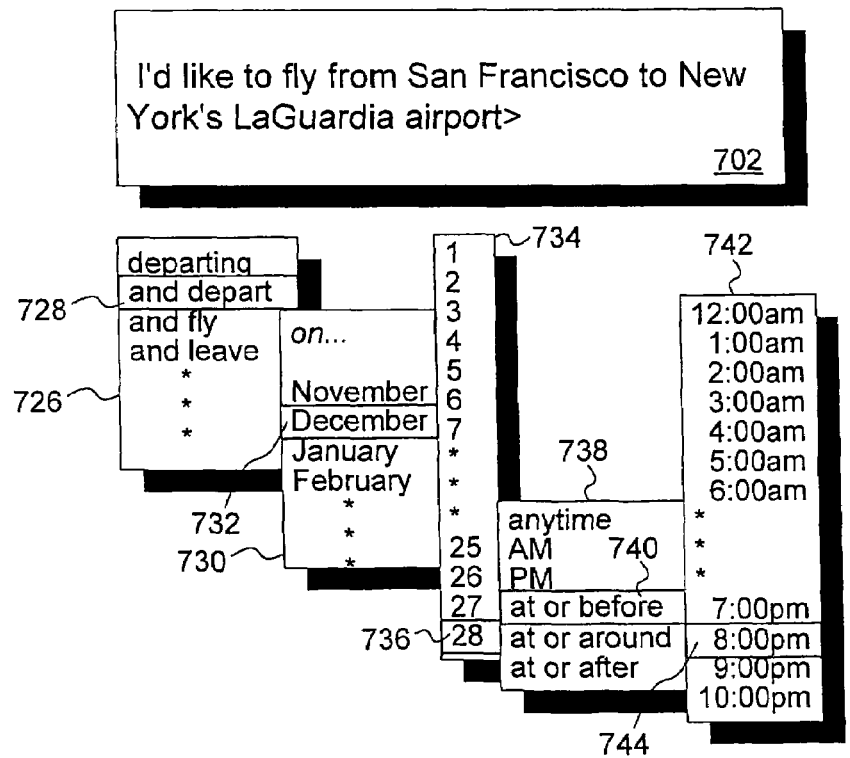

FIG. 7L illustrates the CQ window 702, a seventh menu 726 with a seventh selection 728, an eighth menu 730 with an eighth selection 732, a ninth menu 734 with a ninth selection 736, a tenth menu 738 with a tenth selection 740, and an eleventh menu 742 with an eleventh selection 744. In this example, the seventh menu provides a word or phrase (concerning departure in this example), the eighth menu 730 provides a month of departure, the ninth menu 734 provides a date of departure, the tenth menu 738 provides a word or phrase that indicates a timeframe for departure, and the eleventh menu 742 provides a particular time for departure.

Figure 7M:
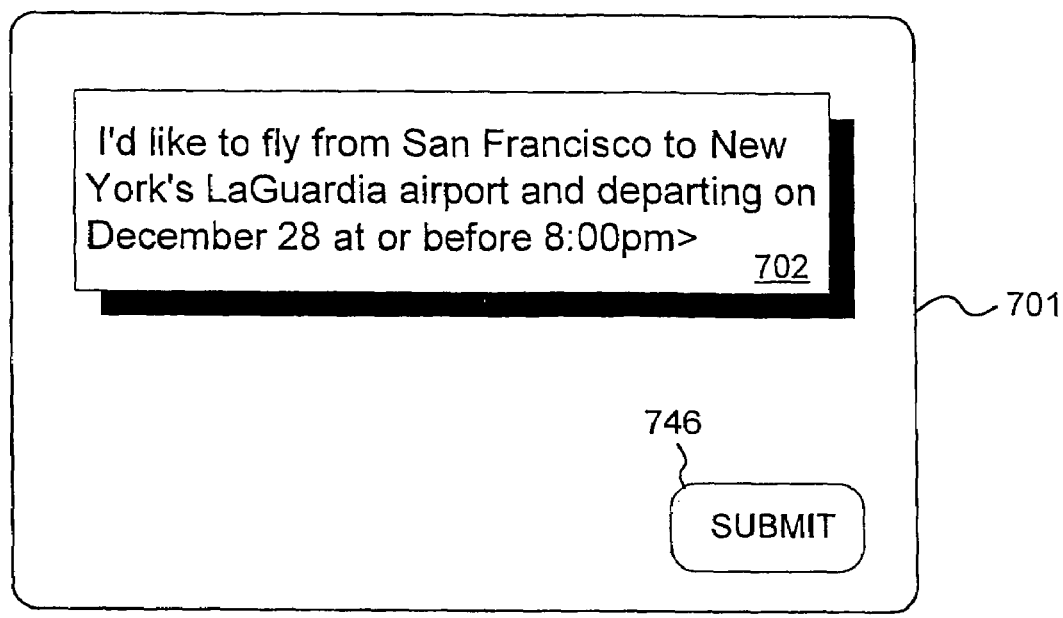

FIG. 7M illustrates a display screen 701, a submit button 746, and the CQ window 702 following the eleventh selection 744. Here, in this example, the CQ is now complete after the eleventh menu selection. Specifically, the CQ is the sentence of "I'd like to fly from San Francisco to New York's La Guardia airport and departing on December 28 at or before 8 pm." Besides the CQ window 702, the display screen 701 includes a submit button 746. The submit button 746 is a touch or stylus sensitive control button or a soft button associated with the computing device. Selection of the submit button 746 allows the user to request that the CQ be processed such that information relevant to the CQ is returned. Although the submit button 746 is only shown in FIG. 7M, a submit button can likewise appear in other of the screens being display in FIGS. 7A-7M. Alternatively, a submit button can be provided as a physical button on the computing device.

The various menus utilized by the invention can be predetermined or dynamically determined. When predetermined, such menus can be stored in a database, a knowledge base or some other data store, as noted above. Alternatively, when the menus are dynamically generated or produced, a menu generator can be utilized. For example, the menu generator can be implemented by a database engine, a software program, or both.

Figure 8:
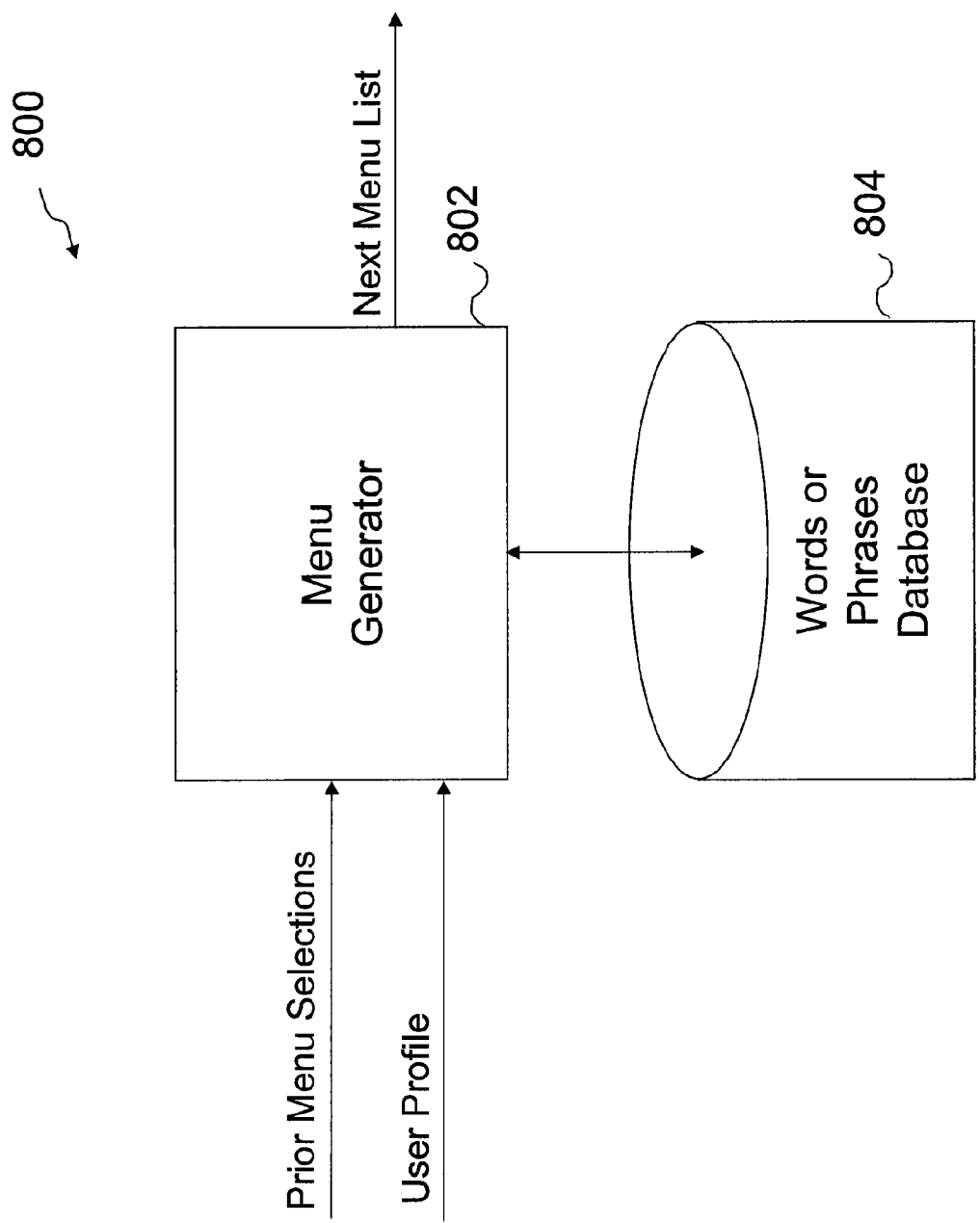
FIG. 8 is a block diagram of a menu producing system according to one embodiment of the invention.

FIG. 8 is a block diagram of a menu producing system 800 according to one embodiment of the invention. The menu producing system 800 includes a menu generator 802 and a word or phrases database 804. The menu generator 802 can receive information about prior menu selections as well as information about a user profile associated with the user. The menu generator 802 also interacts with the words or phrases database 804 to retrieve those words or phrases to be placed in a next menu being produced by the menu generator 802. More specifically, the menu generator 802 produces a next menu list, which is the list of items (e.g., words or phrases) to be listed in the next menu. The items for the next menu list are obtained from the words or phrases database 804. In one embodiment, the words and phrases can be organized as concepts and elements as described in the U.S. Provisional Application No. 60/286,259, filed Apr. 24, 2001, and entitled "METHOD AND SYSTEM FOR INFORMATION RETRIEVAL BASED ON MENU SELECTIONS." Each menu list can be considered as a concept with its elements. Within a menu list, there can be other menu lists. In one embodiment, this is similar to within a concept, there can be other concepts. Contents in the menu lists can change dynamically, just as the elements within a concept can change dynamically, as described in Provisional Application No. 60/254,298. In an embodiment, the menu generator 802 selects the appropriate words or phrases for the items of the next menu list from the words or phrases database 804 in accordance with one or both of prior menu selections and the user profile. In yet another embodiment, prior menu selections can serve to bias the words or phrases most suitable for the next menu list, and the user profile can be used to bias the words or phrases towards those more likely to be used by the user. For example, based on the user profile, he is interested in playing soccer. After he has selected entertainment as an item, the first item in the next menu list can be soccer.

Figure 9:
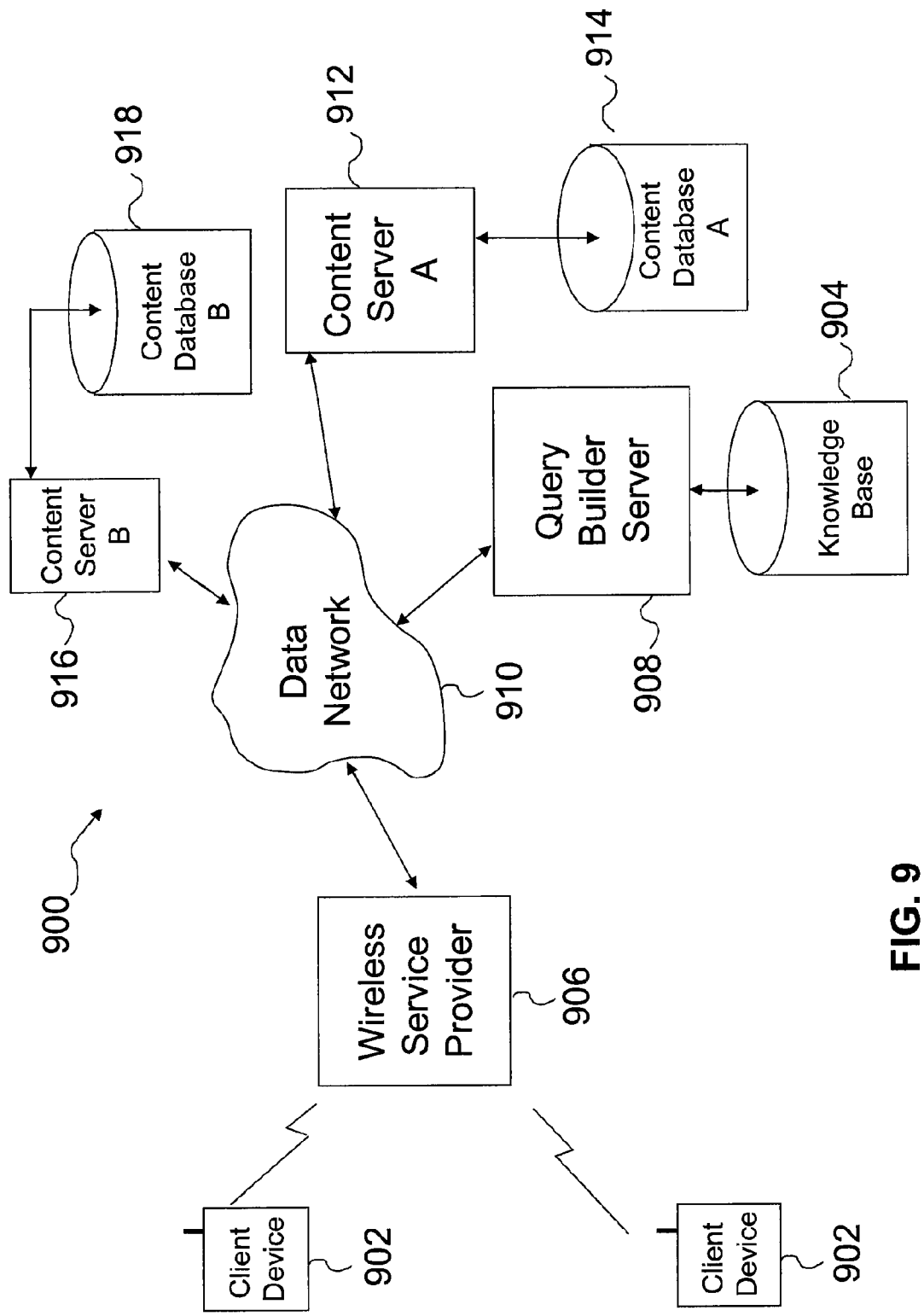
FIG. 9 is a block diagram of a wireless knowledge retrieval system according to another embodiment of the invention.

As noted above, the formation of the phrases, sentences or questions through menu-driven interaction can be performed in a client-server fashion. FIG. 9 is a block diagram of a wireless knowledge retrieval system 900 according to another embodiment of the invention. The wireless knowledge retrieval system 900 enables a plurality of client devices 902 to access a remotely located knowledge base 904. The wireless knowledge retrieval system 900 is generally similar to the wireless knowledge retrieval system 900 illustrated in FIG. 1, though the formation of the phrase, sentence or question is performed on a server machine provided to construct such queries.

More particularly, a user can interact with the client device 902 to request that a query be constructed. This can be initiated by a "make query" type selection or by a selection of a concept (which implies the desire to create a query). In any case, the request can be forwarded to a wireless service provider 906. The wireless service provider 906 can then forward the request to a query builder server 908 through a data network 910. As an example, the data network 910 can comprise the Internet. The query builder server 908 is configured to generate menus suitable for the requesting client device 902. Once a menu is generated, the query builder server 908 returns a response (including the menu) to the requesting client device 902. In this embodiment, the query builder server 908 obtains menu items from the knowledge base 904 and sends the menu items (or the menu items packaged as a menu) to the requesting client device 902. The menu items are displayed to the user at the client device 902. The user then interacts with the client device 902 to select one of the menu items. Once a menu item has been selected, a request is sent to the query builder server 908 that informs the query server builder 908 of the present menu item selection and requests a subsequent menu. The query builder server 908 interacts with the knowledge base 904 to produce the menu items for the next menu and returns such items to the requesting client device 902. This request and response process for the various menus can be repeated until a suitable phrase, sentence or question has been created at which point the user at the client device 902 submits the phrase, sentence or question to a content server for retrieval of the desired information. The wireless knowledge retrieval system 900 also includes a content server A coupled to a content database A 914 as well as a content server B 916 coupled to a content database B 918. Typically, the wireless knowledge retrieval system 900 can request that the phrase, sentence or question be processed at any of the plurality of different content servers, such as the content server A 912 or the content server B 916.

Assuming that the phrase, sentence or question has been directed to the content server A 912 for processing, the content server A receives the phrase, sentence or question and parses or translates that phrase, sentence or question into a database query which is used to retrieve content form the content database A 914. The resulting content is returned to the client device 902 the data network 910 and the wireless service provider 906. At the client device 902, the requested content can then be presented to the user, such as visually on a display screen or audibly through sound output.

With the wireless knowledge retrieval system 900, the client device 902 do not need to store the knowledge base or menu data store needed to provide the various menus utilized in constructing phrases, sentences or questions. Instead, a centralized query builder server, namely the query builder server 908, can be utilized by the client devices 902 in constructing their phrases, sentences or questions. With centralized processing, the updating of the knowledge bases or menu data stores at the client devices 902 is not required as only the centralized knowledge base 904 need be updated. The client device 902 can store some menu items, such as the items (e.g., concepts) for initial menus.

It should be noted that the menu items within any particular menu need not be in the same language. For example, some of the menu items can be in English, while others can be in Chinese.

Additionally it should be noted that the menu items can be ordered within the menus in accordance with any of a variety of different criteria. For example, menu items could be ordered in accordance with a likelihood of their being selected. The likelihood could be determined based on user preferences and/or user history.

Also, in a case in which the menu lists are longer than those able to be initially displayed in a display window associated with the menu, scrolling can be implemented. The ordered list can be scrolled through the display window by the user. It can also scroll automatically and continuously until the user stops it. Selection can be done by point and click with a pointing device, a stylus, a pen or a finger. Selection can also be accomplished by clicking a fixed button when the item to be selected is going by a marker or a window (within the display window). All techniques can be employed to make it easier and faster for the user to select the desired menu items.

The client devices or wireless computing devices interacted with by users to form the phrase, sentence or questions is often a portable or wireless computing device, as noted above. However, it should be noted that the client devices can also be within embedded systems or devices which maybe immobile or wired. For example, the client devices can be embedded in an Internet appliance, television, or a non-portable computer.

The client devices can include some sort of pointing mechanism or voice recognition mechanism to assist a user in making a selection. In other words, the user can use the pointing mechanism to identify and select a menu item, or the user may use his voice to select a menu item. For example, the user may just say, "Cursor up, down, left or right." When the cursor reaches the desired concept, the user may then say, "Enter", and that concept will be selected. In yet another embodiment, a voice synthesizer can indicate to the user the menu item selected. For example, after the user has selected a menu item (e.g., "Cities"), the voice synthesizer can ask the user, "You have selected Cities. Is this correct?" If the user responds affirmatively, the menu item "Cities" will be selected.

The response to the phrase, sentence or questions can also be presented to the user through various means. For example, the response can be presented to the user on a display screen or by way of audio output.

The phrases, sentences or questions formed by the inventive techniques can be used for a variety of purposes. One purpose is to form phrases, sentences or questions for information access. Examples of such applications include help desk or troubleshooting, electronic or on-line searching, and marketing campaigns. Another purpose for the inventive approaches is to author electronic messages or instant messages.

In one embodiment, the phrase, sentence or question is converted into SQL statements. One technique to perform such conversions is described in U.S. Pat. No. 5,836,771, entitled, "Learning Method and System Based on Questioning", which is hereby incorporated by reference. A typical sentence formed can be from more than one phrases. For a number of the phrases, each can have a corresponding SQL segment. The corresponding SQL statement of the sentence can be formed based on the corresponding SQL segments. As a side note, some phrases may not have a corresponding SQL segment, such as the segment, "I'd like to". In another approach, a SQL statement is generated by having a CQ directly link to a SQL statement. The SQL statements can then be executed to retrieve the desired information (or content) from a knowledge base or content database. In another embodiment, the conversion is not to a SQL statement, but the answer is generated by direct mapping. For example, the sentence generated, such as the sentence shown in FIG. 7M, can be mapped directly to an answer.

The invention can be implemented with software, hardware, or a combination of hardware and software. The invention can also be embodied as computer readable code on a computer readable medium. The computer readable medium is any data storage device that can store data which can thereafter be read by a computer system. Examples of computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that user interaction with small scale computing devices is made less burdensome. Users are thus able to enter sentences or questions with relatively little time and motion investment (i.e., efficiently). Another advantage of the invention is that users can interact with computing devices in a natural language manner, yet need not type or write natural language words. Still another advantage of the invention is that the invention is generally useful and can be customized to application specific environments. Yet still another advantage of the invention is that it is very easy to use and does not require lengthy training.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method comprising:
sending a first menu list of words or phrases associated with a plurality of concepts to a device;
receiving a first selection of at least one of the words or phrases in the first menu list from the device, the received first selection identifying a concept for a natural language query to be formed;
identifying a second menu list of words or phrases based at least in part on the identified concept;
sending the identified second menu list to the device;
receiving a second selection of at least one of the words or phrases in the second menu list from the device, the second selection identifying a first segment of the natural language query;
forming the natural language query based at least in part on the first segment, wherein the natural language query does not include the identified concept.

2. A method as recited in claim 1, wherein identifying the second menu list comprises dynamically generating the second menu list based on the first selection of at least one of the words or phrases in the first menu list.

3. A method as recited in claim 1, wherein identifying the second menu list comprises selecting the second menu list from a plurality of predetermined menu lists based on the first selection of at least one of the words or phrases in the first menu list.

4. A method as recited in claim 1, wherein said method further comprises:
sending the natural language query to the device.

5. A method as recited in claim 1, further comprising:
determining whether an additional menu selection is needed to form the natural language query;
if an additional menu selection is needed, sending a third menu list of words or phrases to the device, wherein the third menu list is based on the received second selection;
receiving a third selection of at least one of the words or phrases in the third menu list from the device, the third selection identifying a second segment of the natural language query; and
forming the natural language query based at least in part on the second segment.

6. A method as recited in claim 1, further comprising:
generating a response to the natural language query; and
providing the response to the device.

7. A method comprising:
receiving, at a device, a first menu list of words or phrases, the received first menu list including a plurality of concepts associated with a natural language query to be formed;
sending, from the device to a second device, a first selection of a first word or phrase from the first menu list, wherein the first selection identifies a concept for the natural language query to be formed;
receiving a second menu list of words or phrases at the device, wherein the second menu list is based at least in part on the identified concept;
sending, from the device to the second device, a second selection of a second word or phrase from the second menu list, the second selection identifying a first segment of the natural language query, wherein the natural language query is based at least in part on the first segment, and further wherein the natural language query does not include the identified concept; and
receiving a response to the natural language query at the device.

8. A method as recited in claim 7, wherein the method further comprises:
displaying the natural language query on the device.

9. A method as recited in claim 8, wherein displaying the natural language query comprises incrementally updating the natural language query as selections are individually made.

10. A method as recited in claim 7, wherein the second menu list has a grammatical or contextual relationship with the first menu list.

11. A method as recited in claim 7, wherein the device is a hand-held or wearable computing device.

12. A method as recited in claim 7, wherein the second menu list is based at least in part on a profile that includes one or more of a selection history, a preference, content, or an application.

13. A method as recited in claim 7, wherein the second menu list is identified from a plurality of predetermined menu lists.

14. A computer-readable medium comprising computer-readable instructions configured to cause a computing device to:
send a first menu list of words or phrases associated with a plurality of concepts to a second device;
receive a first selection of at least one of the words or phrases in the first menu list from the second device, the received first selection identifying a concept for the query to be formed;
identify a second menu list of words or phrases based on the received first selection;
send the identified second menu list to the second device;
receive a second selection of at least one of the words or phrases in the second menu list from the second device, the second selection identifying a first segment of the query;
form the query as a natural language query based at least in part on the received second selection, wherein the natural language query does not include the identified concept; and
provide, to the second device, a response to the query.

15. The computer-readable medium of claim 14, wherein identifying the second menu list comprises dynamically generating the second menu list based on the first selection of at least one of the words or phrases in the first menu list.

16. The computer-readable medium of claim 14, wherein identifying the second menu list comprises selecting the second menu list from a plurality of predetermined menu lists based on the first selection of at least one of the words or phrases in the first menu list.

17. The computer-readable medium of claim 14, wherein the instructions further cause the computing device to:
form a request for the response to the formed query; and
transmit the request to a third device.

18. A computer-readable medium comprising computer-readable instructions configured to cause a computing device to:
receive a first menu list of words or phrases, the received first menu list including a plurality of concepts associated with a natural language query to be formed;
send a first selection of a first word or phrase from the first menu list to a second device, wherein the first selection identifies a concept for the natural language query to be formed;
receive a second menu list of words or phrases, wherein the second menu list is selected based at least in part on the identified concept;
send a second selection of a second word or phrase from the second menu list to the second device, the second selection identifying a first segment of the natural language query, and wherein the natural language query does not include the identified concept; and
receive a response to the natural language query.

19. A computer-readable medium as recited in claim 18, wherein the second menu list is further based at least in part on a profile that includes one or more of a selection history, a preference, content, or an application.

20. A device comprising:
a processor;
a communication interface operably coupled to the processor; and
a computer-readable medium including computer-readable instructions stored therein that, upon execution by the processor, cause the processor to
send a first menu list of words or phrases associated with a plurality of concepts to a device;
receive a first selection of at least one of the words or phrases in the first menu list from the device, the received first selection identifying a concept for a query to be formed;
identify a second menu list of words or phrases based at least in part on the received first selection;
send the identified second menu list to the device;
receive a second selection of at least one of the words or phrases in the second menu list from the device, the second selection identifying a first segment of the query;
form the query as a natural language query based at least in part on the received first selection and the received second selection, wherein the natural language query does not include the identified concept; and
provide a response to the query to the device.

21. The device of claim 20, wherein the second menu list is dynamically generated based on the first selection.

22. The device of claim 20, wherein the second menu list is selected from a plurality of predetermined menu lists based on the first selection.

23. The device of claim 20, wherein the instructions further cause the processor to:
send a request for the response to a third device; and
receive the response from the third device.

* * * * *

UNITED STATES PATENT AND TRADEMARK OFFICE
CERTIFICATE OF CORRECTION

| | |
|---|---|
| PATENT NO. | : 7,548,899 B1 |
| APPLICATION NO. | : 10/006930 |
| DATED | : June 16, 2009 |
| INVENTOR(S) | : Del Favero, Jr. et al. |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 227 days Delete the phrase "by 227 days" and insert -- by 482 days --

Signed and Sealed this

Twentieth Day of April, 2010

David J. Kappos
*Director of the United States Patent and Trademark Office*